Patented Sept. 14, 1948

2,449,192

UNITED STATES PATENT OFFICE 2,449,192

N-ALKENYL PHENYLACETAMIDES

Otto K. Behrens and Quentin F. Soper, Indianapolis, Ind., assignors to Eli Lilly and Company, Indianapolis, Ind., a corporation of Indiana No Drawing. Application August 24, 1945, Serial No. 612,527

4 Claims. (Cl. 260—558)

This invention relates to a group of new organic compounds and is directed to certain substituted phenylacetamides.

By this invention there are provided new phenylacetamide compounds which may be represented by the following formula

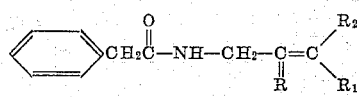

wherein R, R₁ and R₂ represent hydrogen, methyl or ethyl.

By way of illustration, referring to the above formula, when R, R₁ and R₂ represent hydrogen, the compound is N-allyl-phenylacetamide. When R and R₁ represent hydrogen and R₂ represents methyl, the compound is N-crotyl-phenylacetamide. When R represents methyl and R₁ and R₂ represent hydrogen, the compound is N-(2-methylallyl)-phenylacetamide. When R represents hydrogen and R₁ and R₂ represent methyl, the compound is N-(3,3-dimethylallyl)-phenylacetamide. Additionally, when R and R₁ represent hydrogen and R₂ represents ethyl, the compound is N-(3-ethylallyl)-phenylacetamide.

The compounds of the present invention are white crystalline compounds which are soluble in the common organic solvents such as alcohol, ether and acetone, are relatively slightly soluble in water, and are substantially insoluble in petroleum ether.

Broadly speaking, the compositions of the present invention may be prepared by phenylacetylating an alkenylamine or by alkenylating phenylacetamide. Thus, by reacting an alkenylamine, for example allylamine, with a phenylacetylating agent such as phenylacetic acid, phenylacetyl chloride or ethyl phenylacetate, an N-alkenyl-phenylacetamide namely, N-allyl-phenylacetamide, is produced. Alternatively, by reacting an alkenyl halide such as allyl bromide with a metallo derivative of phenylacetamide, for example the potassium derivative, the same compound may be obtained.

As described and claimed in copending application, Serial No. 612,528, U. S. Patent 2,440,357, filed on even date herewith, compounds of this invention have been found to exhibit novel and unexpected utility in the preparation of penicillin. By way of contrast, this utility is not possessed by substituted phenylacetamides in general. It is known, of course, that penicillin may be produced, presumably as a metabolic product, when a Penicillium mold of the notatum-chrysogenum group is grown in the presence of a nutrient medium, and the penicillin so produced subsequently may be isolated from the mixture of mold and nutrient medium.

As disclosed in said copending application, an accelerated production and an increased yield of penicillin may be obtained by incorporating a relatively small amount of the compound of the present invention in the culture medium of nutrient material in which the Penicillium mold is grown.

Illustratively, by carrying out the process of copending application Serial No. 612,528, U. S. Patent 2,440,357, by employing, for example, one or more of the compositions of the present invention in a submerged culture process, the concentration of penicillin produced in certain tests under comparative conditions has been substantially increased.

This invention is further illustrated by the following examples:

Example 1

N-allyl-phenylacetamide represented by the formula

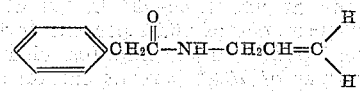

may be prepared as follows:

A mixture of 57 g. of allylamine and 150 g. of methyl phenylacetate is refluxed for about 2½ days. The methyl alcohol formed during the reaction is substantially completely removed by subjecting the reaction mixture to a vacuum while maintaining the reaction mixture at a temperature of about 50° C. The reaction mixture comprising N-allyl-phenylacetamide and ethyl phenylacetate is then cooled to about 0° C. whereupon the N-allyl-phenylacetamide separates in crystalline form. It is isolated by filtration, and is partially purified by recrystallization from dilute ethyl alcohol, and further purified by recrystallization from benzene. The N-allyl-phenylacetamide thus obtained melts at about 53–55° C. Analysis has shown the presence of 75.54 percent carbon, 7.42 percent hydrogen, and 7.92 percent nitrogen as compared with the calculated values of 75.40 percent carbon, 7.48 percent hydrogen, and 8.00 percent nitrogen.

Example 2

N-crotyl-phenylacetamide represented by the formula

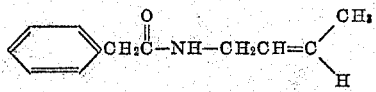

may be prepared as follows:

3.9 g. of crotylamine dissolved in 20 cc. of water are treated with 8.5 g. of phenylacetyl chloride which are added in about 1 cc. portions. Between each addition the mixture is shaken and maintained at a temperature below 25° C. by external cooling. During the addition of the phenylacetyl chloride the reaction mixture is maintained alkaline by the addition of small amounts of 40 percent sodium hydroxide solution. The precipitate of N-crotyl-phenylacetamide which separates during the reaction is removed by filtration. It is purified by recrystallization from 70 percent aqueous ethanol. The purified N-crotyl-phenylacetamide melts at about 57–59° C. Analysis has shown the presence of 76.09 percent carbon and 7.61 percent hydrogen as compared with the calculated values of 76.15 percent carbon and 7.99 percent hydrogen.

*Example 3*

N-(3,3-dimethylallyl)-phenylacetamide represented by the formula

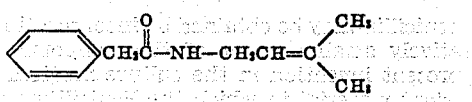

may be prepared as follows:

30 g. of phenylacetamide are dissolved in 200 cc. of dioxane and 7.8 of potassium are added. When all of the potassium has reacted, 29.8 g. of 3,3-dimethylallyl bromide are added slowly. The reaction mixture is allowed to stand for about 10 hours and is then warmed at about 100° C. for one hour. The potassium bromide which separates is filtered off and the filtrate evaporated in vacuo yielding the N-(3,3-dimethylallyl)-phenylacetamide as a solid. This product is partially purified by recrystallization from dilute ethanol and is further purified by recrystallization from a mixture of benzene and petroleum ether. The N-(3,3-dimethylallyl)-phenylacetamide thus purified melts at about 66–68° C. Analysis has shown the presence of 76.84 percent carbon and 8.74 percent hydrogen as compared with the calculated values of 76.81 percent carbon and 8.43 percent hydrogen.

*Example 4*

N-(2-methylallyl)-phenylacetamide represented by the formula

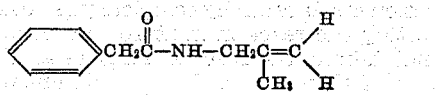

may be prepared as follows:

27 g. of phenylacetamide, 7.8 g. of potassium and 18.1 g. of 2-methallyl chloride are interreacted by the method used for the preparation of N-(3,3-dimethylallyl)-phenylacetamide as described in Example 3. N-(2-methylallyl)-phenylacetamide thus prepared, and recrystallized from benzene-petroleum ether mixture melts at about 46–48° C. Analysis has shown the presence of 76.47 percent carbon, 8.25 percent hydrogen and 7.74 percent nitrogen as compared with the calculated values of 76.15 percent carbon, 7.99 percent hydrogen and 7.40 percent nitrogen.

What is claimed is:

1. N-allyl-phenylacetamide represented by the formula

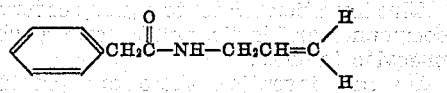

2. N-crotyl-phenylacetamide represented by the formula

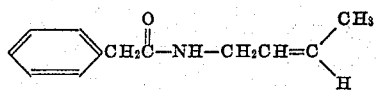

3. N-(3,3-dimethylallyl)-phenylacetamide represented by the formula

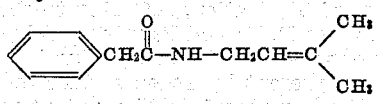

4. A member of the group consisting of N-allyl-phenylacetamide, N-crotyl-phenylacetamide, N-(2-methylallyl)-phenylacetamide, N-(3-ethylallyl)-phenylacetamide and N-(3,3-dimethylallyl)-phenylacetamide.

OTTO K. BEHRENS.
QUENTIN F. SOPER.

REFERENCES CITED

The following references are of record in the file of this patent:

Bergmann et al., "Berichte der Deutschen chemischen Gesellschaft," vol. 54 (1921), p. 2143.